April 1, 1924.  R. B. WICKER  1,488,965

SALT DRIER

Filed Sept. 6, 1923

INVENTOR:
Robert B. Wicker
By Chapin A. Ferguson
ATTORNEY.

Patented Apr. 1, 1924.

1,488,965

UNITED STATES PATENT OFFICE.

ROBERT B. WICKER, OF BALTIMORE, MARYLAND.

SALT DRIER.

Application filed September 6, 1923. Serial No. 661,122.

*To all whom it may concern:*

Be it known that I, ROBERT B. WICKER, a citizen of the United States, residing at Baltimore, in the State of Maryland, have invented certain new and useful Improvements in Salt Driers, of which the following is a specification.

This invention relates to improvements in salt driers, and has for its object to provide a cabinet having a number of perforated shelves on which the salt shakers rest when not in use, a drum in which the salt is kept and from which the shakers are filled, and means for heating the cabinet to a predetermined degree of heat sufficient to absorb the moisture and keep the salt in the shakers and said drum perfectly dry.

The invention consists of the novel construction and arrangement of the parts and combination of parts hereinafter more fully set forth in the following specification and pointed out in detail in the appended claims.

In the accompanying drawing,—

Figure 1:
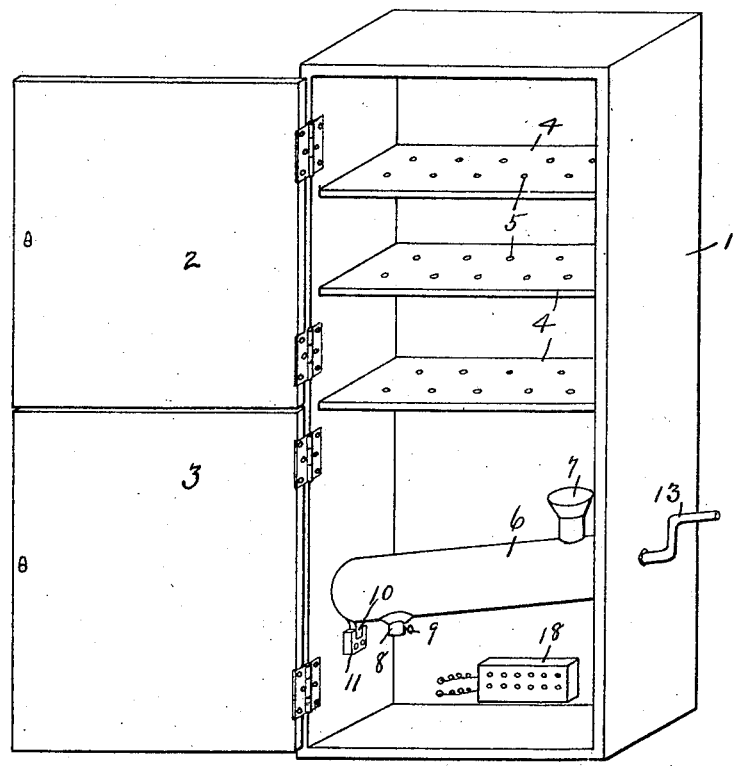
Figure 1 is a perspective view of a cabinet showing my invention applied thereto.
Figure 2:
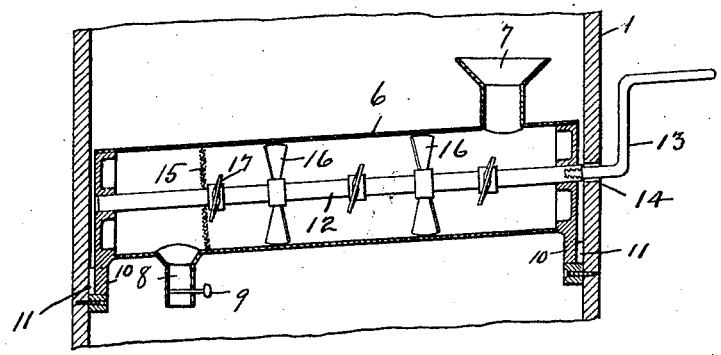
Figure 2 is a vertical longitudinal section of the salt drum, on an enlarged scale.

Referring to the accompanying drawing, forming part of this specification, and in which like reference numerals designate like parts throughout the several views thereof, 1 designates a cabinet which may be made of wood, metal, or other suitable material, and is provided with doors 2 and 3, but one door may be employed if desired. Within the cabinet 1 are a number of shelves 4 having perforations 5 through which the heat passes to the shakers (not shown) which rest on the said shelves when not in use. Below the shelves 4 is removably secured a drum 6 having a hopper 7 near one end and a discharge nozzle 8 near the other end; the said discharge nozzle 8 is provided with a cut-off valve 9 to control the discharge of salt from the drum 6 to the shakers being filled. The said drum 6 is mounted on an incline downwardly from the hopper to the discharge nozzle, and has projections 10 at each end which fit into the sockets 11 on the cabinet 1 so that the said drum can be removed when desired. Within the drum 6 is revolubly mounted a shaft 12 which is revolved by means of the crank 13 screwed into one end of the said shaft and projecting through an aperture 14 in the side of the cabinet 1. The said drum 6 is also provided on the inside with a stationary perforated disk 15. The shaft 12 is provided with a number of blades or agitators 16 and two blades 17 arranged close to the disk 15 and set at an angle so that they will crush any lumps of salt against the disk 15 before it can pass through the apertures in said disk. Below the drum 6 is an electric heater 18 connected to a suitable electric supply, which keeps the cabinet at a predetermined temperature sufficient to keep the salt in the shakers and in the drum perfectly dry.

The salt is poured into the hopper 7 and runs down into the drum 6, where it is kept dry at all times. When the crank 13 is turned the salt will be forced down through the apertured disk 15 to the lower end of the drum 6 and into the discharge nozzle 8. When it is desired to fill the shaker the latter is held under the discharge nozzle 8 and the cut off valve 9 operated to allow the salt to flow into the shaker and is cut off when the latter is sufficiently filled. This operation is repeated as often as it is desired to fill a shaker. When the shakers are not in use they are kept in the cabinet on the shelves 4 where the salt therein will be kept perfectly dry.

My invention is especially adapted for use in hotels and steamboats, or wherever a great amount of moisture is absorbed by the salt.

The cabinet 1 may be of any desired size to accommodate the number of shakers employed.

Having thus described my invention, what I claim is:

1. A salt drier comprising a cabinet, a drum removably secured in said cabinet and having an inlet and an outlet for the salt, means for forcing the salt through the drum, and a heater within said cabinet.

2. A salt drier comprising a cabinet having a number of shelves arranged therein, a drum removably secured in said cabinet below said shelves and having an inlet and an outlet for the salt, means for forcing the salt through the said drum, and a heater within said cabinet.

3. A salt drier comprising a cabinet having a number of shelves arranged therein, a drum removably secured in said cabinet and having an inlet and an outlet for the salt, a stationary perforated disk within said drum, a shaft mounted in said drum and having agitators thereon, means for revolving said shaft, and means for heating said cabinet.

In testimony whereof I affix my signature.

ROBERT B. WICKER.